H. W. BROWN.
ELECTRIC RELAY.
APPLICATION FILED DEC. 19, 1913.

1,201,018.

Patented Oct. 10, 1916.
2 SHEETS—SHEET 1.

WITNESSES:

INVENTOR
Harold W. Brown
BY
Wesley G. Carr
ATTORNEY

UNITED STATES PATENT OFFICE.

HAROLD W. BROWN, OF ITHACA, NEW YORK, ASSIGNOR TO WESTINGHOUSE ELECTRIC AND MANUFACTURING COMPANY, A CORPORATION OF PENNSYLVANIA.

ELECTRIC RELAY.

1,201,018.  Specification of Letters Patent.  Patented Oct. 10, 1916.

Application filed December 19, 1913. Serial No. 807,711.

*To all whom it may concern:*

Be it known that I, HAROLD W. BROWN, a citizen of the United States, and a resident of Ithaca, in the county of Tompkins and State of New York, have invented a new and useful Improvement in Electric Relays, of which the following is a specification.

My invention relates to electrical protective devices and particularly to relays, and it has for its object to provide a self-inclosed double relay for protecting electric circuits.

Numerous relays have been provided to protect three-wire systems, but they have been distinct units which required combining to produce an operative device. In my invention, I provide a self-contained double relay, having its armatures tensioned by the same spring and of such a construction as to occupy a minimum space and, at the same time, to give a maximum pull. One calibration is all that is required to regulate both electromagnets.

Figure 2:
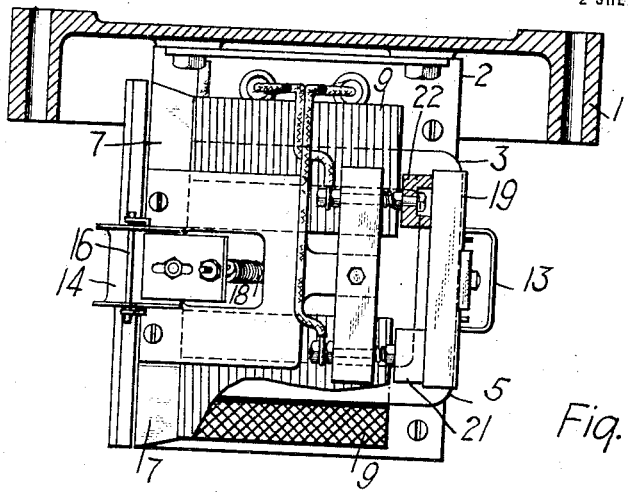
Figure 1:
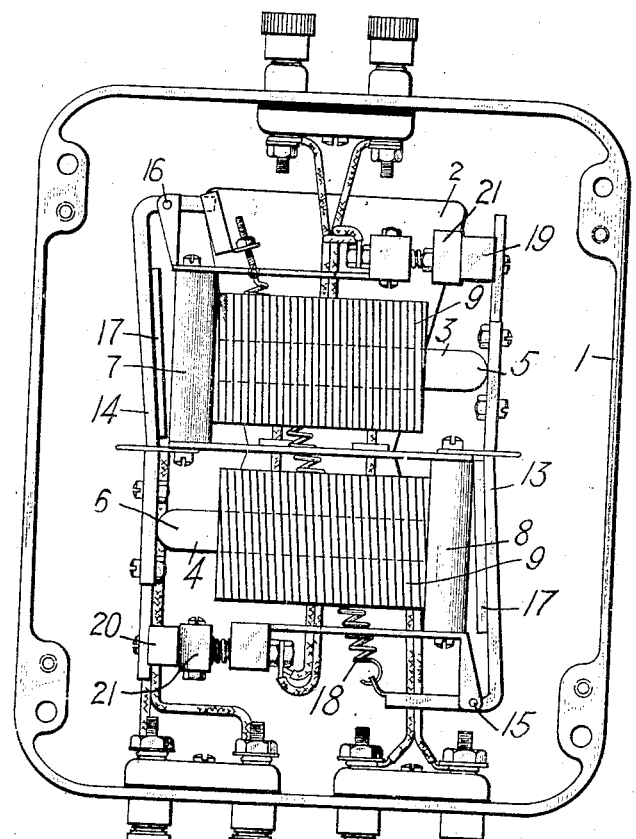

In the accompanying drawings, Figure 1 is a front elevational view of a double relay embodying my invention. Fig. 2 is a top plan view, partially in section, of the relay shown in Fig. 1, and Fig. 3 is a diagrammatic view of my invention as applied to the protection of a three-wire direct current system.

Referring to the drawings, my invention comprises a case 1 having a framework 2, on which are mounted oppositely disposed electromagnets 3 and 4 comprising, respectively, cores 5 and 6 having enlarged faces 7 and 8 and four coils 9, three of which are shown on the drawings. Movable L-shaped members 13 and 14 are pivotally mounted on the frame 2 at points 15 and 16. Each of the movable members 13 and 14 is provided with a magnetizable armature 17 that is mounted directly opposite the enlarged pole faces 7 and 8. The relatively short arms of the members 13 and 14 are connected together by a spring 18. The member 13 has a conducting block 19 attached thereto and the member 14 has a similar conducting block 20 attached to it. The blocks 19 and 20 are adapted to engage, respectively, stationary contact members 21 and 22.

Figure 3:
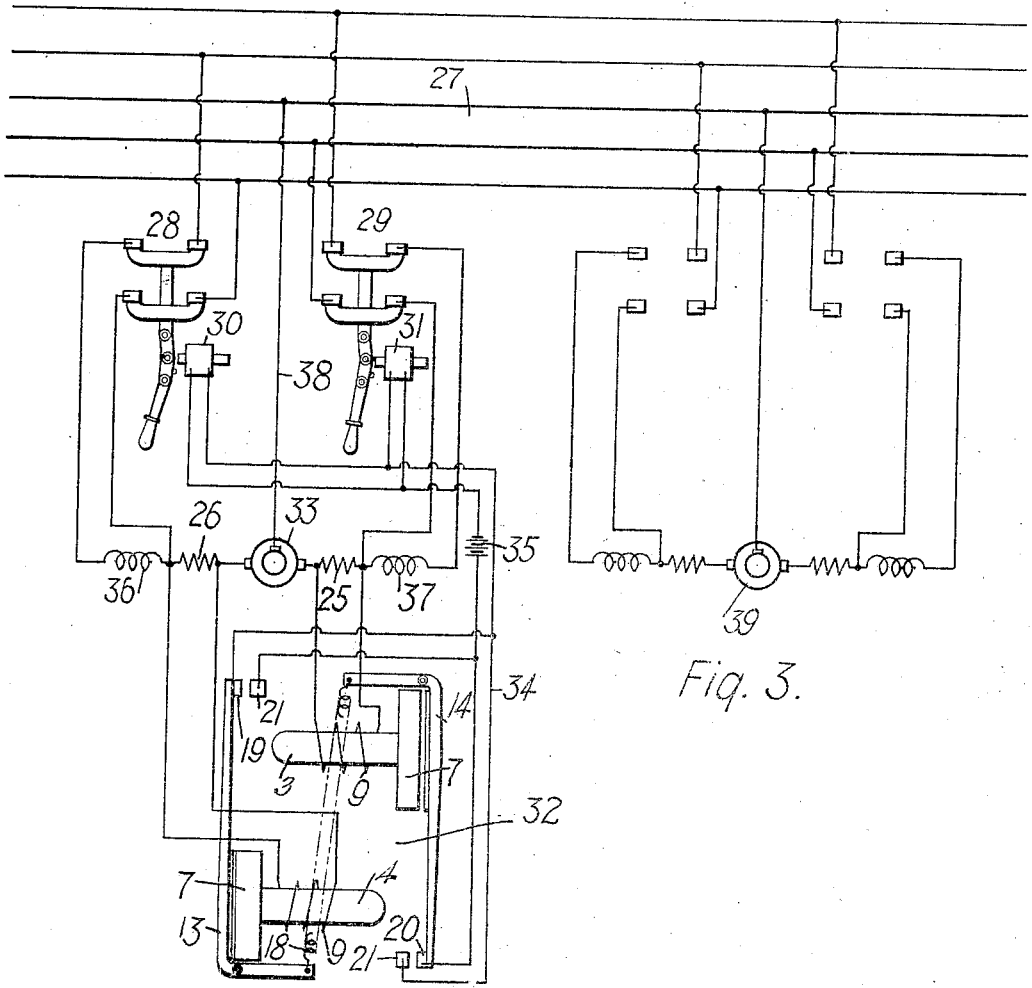

In Fig. 3 of the drawings, the coils 19 of the electromagnets 3 and 4 are connected in shunt relation to resistors 25 and 26, respectively. The resistors 25 and 26 are connected in series with the field magnet windings 37 and 36, respectively, of a three-wire generator 33. The generator 33 is connected, through its neutral conductor 38 and through circuit interrupters 28 and 29, to a three-wire distributing circuit 27. The circuit interrupters 28 and 29 are adapted to be tripped by trip coils 30 and 31, respectively, which are controlled by the operation of the relay 32 embodying my invention.

When an overload is supplied by the generator 33 that causes the current in the resistor 25 to increase, the voltage drop in the resistor will likewise increase and the electromagnet 3 will be energized to attract its armature 17 and cause the conducting member 20 to engage the stationary contact members 21 and 22. The engagement of the contact member 20 with the stationary contact members 21 and 22 completes a circuit 34 from a battery 35 through the coils of the electromagnets 30 and 31 which, when energized, cause both the circuit interrupters 28 and 29 to trip. If an overload upon the generator 33 causes the voltage drop across the resistor 26 to increase, the other electromagnet 4 operates to close the circuit between the other stationary contact members 21 and 22, to thus trip the circuit interrupters, as hereinbefore explained. The two pairs of contact members 21 and 22 are connected in parallel for simultaneous operation.

The spring 18 is so adjusted that the electromagnets can operate on any predetermined current and has the advantage that one adjustment is sufficient for both electromagnets. The circuit interrupters 28 and 29 are of the two-pole variety in order that current may not traverse the field magnet windings 36 and 37 when the generator 33 is disconnected from the line. The reason for this is that a circulating current will traverse the neutral wire 38 from a generator 39, that is connected in parallel with the generator 33, if the field windings were not disconnected.

The movable members are so shaped as to assume positions in which their armatures are parallel to the pole faces when normal load traverses the coils 9. The pole faces are made of large surface to decrease the leakage flux and thereby give a strong pull, It will be readily understood that a relatively strong pull will be exerted when the armature is parallel to the stationary core member. Since the pull is relatively stronger after the armature has moved nearer to the enlarged faces, it will be seen that it is a decided advantage to increase the initial pull.

I do not limit my invention to be applied exclusively to the protection of three-wire direct current systems as it is applicable to numerous uses, as set forth in the appended claims.

I claim as my invention:

1. In a relay, the combination with two parallel oppositely-disposed independent electromagnets, of oppositely-disposed armatures for the opposite ends of the said electromagnets, and a single means for yieldingly retaining the said armatures in their initial positions.

2. In a relay, the combination with parallel oppositely-disposed independent electromagnets, of oppositely-disposed armatures for said electromagnets, said electromagnets having enlarged pole faces on opposite ends with respect to each other, a single resilient means for restraining the operation of the said armatures, and a plurality of contact members operatively connected to the said armatures.

3. A relay comprising two substantially parallel independent electromagnets, L-shaped movable members having independent armatures attached thereto, a single resilient means for adjusting the said movable members and contact members mounted on the said movable members, said electromagnets being so disposed that the armatures engage opposite poles of the electromagnets.

4. In a relay, the combination with two oppositely-disposed independent electromagnets, said electromagnets having pole faces of enlarged section, of pivoted members having armatures attached thereto, a single resilient member for adjusting said pivoted members, a bridging member carried by said pivoted members, and pairs of stationary contact members for engaging said bridging members.

5. In a relay, the combination with two oppositely disposed independent electromagnets, of L-shaped pivoted members having armatures mounted thereon for engaging the opposite ends of the respective electromagnets, a single spring for adjusting the said pivoted members, and coöperating contact members actuated by the said pivoted members.

6. In a relay, the combination with two parallel oppositely disposed electromagnets having pole faces of enlarged section on opposite ends with respect to each other, of pivoted members having armatures attached thereto, a single spring for coöperating with the said pivoted members to maintain the armatures in parallel relation to the pole faces when the said electromagnets are deenergized, a bridging member carried by the said pivoted members, and a pair of stationary contact members for each bridging member.

In testimony whereof, I have hereunto subscribed my name this 28th day of November 1913.

HAROLD W. BROWN.

Witnesses:
 FRED L. CLARK,
 L. C. PROCTOR.